(No Model.) 2 Sheets—Sheet 1.

M. O. REEVES.
FRICTION CLUTCH.

No. 541,571. Patented June 25, 1895.

Witnesses
U. M. Hood.
M. V. Hood.

Inventor
Milton O. Reeves.
By Attorney
H. P. Hood.

(No Model.)　　　　　M. O. REEVES.　　2 Sheets—Sheet 2.
FRICTION CLUTCH.

No. 541,571.　　　　　　　Patented June 25, 1895.

Witnesses
V. M. Hood.
M. V. Hood

Inventor
Milton O. Reeves.
By Attorney
H. P. Hood.

UNITED STATES PATENT OFFICE.

MILTON O. REEVES, OF COLUMBUS, INDIANA, ASSIGNOR TO THE REEVES PULLEY COMPANY, OF SAME PLACE.

FRICTION-CLUTCH.

SPECIFICATION forming part of Letters Patent No. 541,571, dated June 25, 1895.

Application filed November 12, 1894. Serial No. 528,508. (No model.)

*To all whom it may concern:*

Be it known that I, MILTON O. REEVES, a citizen of the United States, residing at Columbus, in the county of Bartholomew and State of Indiana, have invented a new and useful Improvement in Friction-Clutches, of which the following is a specification.

My invention relates to an improvement in friction-clutches for loose pulleys.

The object of my improvement is, to combine with a pulley of that class shown in United States Patent No. 409,426, issued to me August 20, 1889, a simple and effective means for using the pulley as a loose-pulley, and for connecting it to a shaft, when required, so as to revolve therewith.

The accompanying drawings illustrate my invention.

Figure 4:
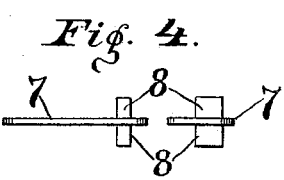
Figure 3:
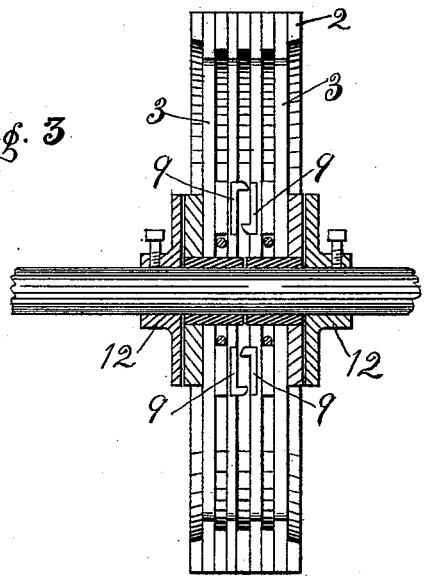
Figure 1:
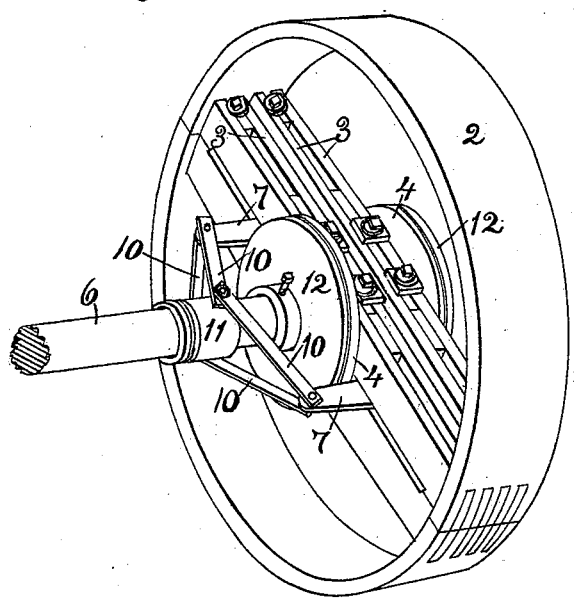
Figure 2:
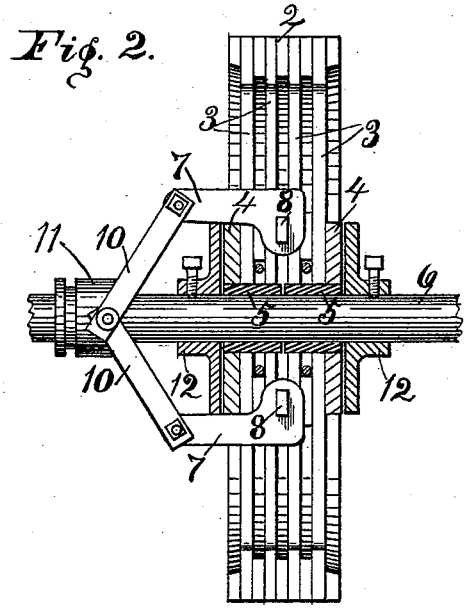
Figure 5:
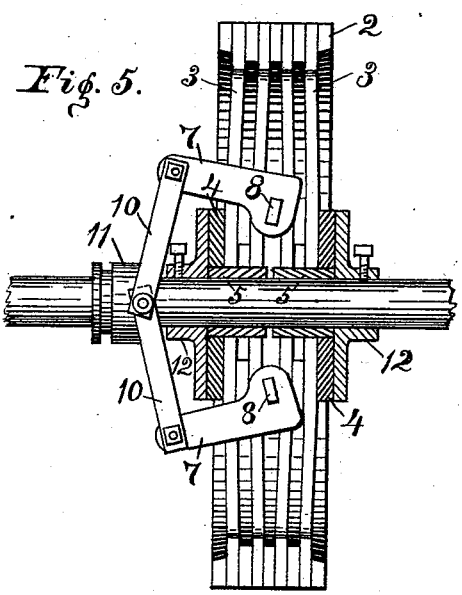

Figure 1 is a view in perspective of the pulley and its clutch in position on its shaft. Fig. 2 represents a diametrical longitudinal section of the pulley and the clutching mechanism in position on the shaft, the clutch being released. Fig. 3 represents a similar section having the clutch removed. Fig. 4 represents a plan and an end elevation of one of the clutch-levers. Fig. 5 represents a section like Fig. 2, showing the clutch engaged.

The pulley may be a whole, or a split pulley as required. In the drawings I have represented a split-pulley. Each segment of the pulley consists, essentially, of a semi-circular rim having its ends connected by a diametrical cross-bar consisting of a series of thin flat bars with open spaces between them parallel with the circumferential plane of the pulley.

In the drawings, 2, indicates the rim, and 3, the individual members forming the diametrical cross-bar. The outermost of said bars, on each side, are provided with hubs, 4, 4, each presenting a broad plane surface at right angles to the axis of the pulley. The pulley is provided with a central metallic bushing, formed preferably of two parts, 5, 5, in which a shaft, 6, is mounted.

Mounted upon opposite sides of the shaft are a pair of levers, 7, 7, each of which is provided with a pair of oppositely projecting rectangular trunnions, 8, 8. Said trunnions are mounted in bearing-plates, 9, 9, secured to the opposed surfaces of two of the flat bars which go to make up the diametrical cross-bar, the free ends of the levers projecting outward through the side of the cross-bar, and the arrangement being such that, when the free ends of the pair of levers carrying the trunnions are forced apart the trunnions are turned in their bearings, thus springing the cross-bars, and, in effect, lengthening the hub of the pulley. The free ends of the levers 7 are connected, by a pair of toggle-levers, 10, 10, with a sleeve, 11, which is mounted upon the shaft so as to turn and slide longitudinally thereon.

Mounted upon the shaft and secured thereto so as to turn therewith, are a pair of collars, 12, 12, having broad radial flanges of the same diameter as the hub of the pulley. Said collars are secured to the shaft, opposite the ends of the pulley hub, at such a distance apart as to just clear the hub and allow the pulley to revolve freely between the collars when the parts are in the position shown in Fig. 2.

It will be understood that the spaces shown in Fig. 2, between the ends of the hub and the collars 12, are exaggerated in order that they may be clearly shown; the distance shown being sufficient for a full sized pulley.

In operation, when it is desired that the pulley and the shaft shall turn together, sleeve 11 is forced along the shaft toward the pulley by means of a shipping-lever, (not shown,) of any well known form. Toggle-levers 10 are by this movement straightened, and the ends of levers 7 are forced apart, thus twisting or turning trunnions 8 in their bearings on the pulley, and forcing the opposite ends of the hubs apart and into close frictional contact with the opposed faces of the fixed collars 12.

Upon shifting the sleeve in the opposite direction the parts are returned to their normal position, and the ends of the hub are withdrawn from the collar by the recoil of the cross bars.

I claim as my invention—

1. The combination with a pulley having a compound diametrical cross-bar consisting of a series of thin flat bars with open spaces between them parallel with the circumferential plane of the pulley, and a pair of fixed collars secured opposite the ends of the hub of said pulley to the shaft upon which the pulley is mounted, of a pair of levers arranged on opposite sides of the center of the pulley, each of said levers being provided with oppositely projecting trunnions which are supported in bearings secured to the opposed faces of two of the flat bars forming the compound crossbar, and means for turning said trunnions in their bearings, whereby the ends of the hub of the pulley are forced apart and into frictional contact with the collars, substantially as set forth.

2. In a friction clutch, the combination with a pulley having a longitudinally extensible hub, of a shaft passing through the hub, a pair of fixed collars secured to the shaft opposite the ends of said hub, a pair of levers each provided with trunnions and mounted in bearings formed in the pulley on opposite sides of the center thereof, a sleeve arranged to turn and to slide longitudinally upon the shaft, and a pair of toggle-levers pivoted to said sleeve and the free ends of the levers having the trunnions, all arranged to co-operate substantially as set forth, whereby the ends of the hub are forced apart and into frictional contact with the collars for the purpose set forth.

MILTON O. REEVES.

Witnesses:
  H. P. HOOD,
  V. M. HOOD.